US008140121B2

(12) United States Patent
Matsukura et al.

(10) Patent No.: US 8,140,121 B2
(45) Date of Patent: Mar. 20, 2012

(54) BASE STATION APPARATUS, COMMUNICATION SYSTEM AND COMPUTER PROGRAM

(75) Inventors: Ryuichi Matsukura, Kawasaki (JP);
Shingo Fujimoto, Kawasaki (JP);
Motoshi Sumioka, Kawasaki (JP); Ryo Miyamoto, Kawasaki (JP)

(73) Assignee: Fujitsu Limtied, Kawasaki (JP)

( * ) Notice: Subject to any disclaimer, the term of this patent is extended or adjusted under 35 U.S.C. 154(b) by 408 days.

(21) Appl. No.: 12/534,689

(22) Filed: Aug. 3, 2009

(65) Prior Publication Data

US 2009/0290553 A1 Nov. 26, 2009

Related U.S. Application Data

(63) Continuation of application No. PCT/JP2007/057125, filed on Mar. 30, 2007.

(51) Int. Cl.
*H04B 1/38* (2006.01)

(52) U.S. Cl. .................. 455/560; 370/329; 455/453

(58) Field of Classification Search .............. 455/456.5, 455/560, 56, 452.1, 453, 8; 370/351, 329, 370/335, 237
See application file for complete search history.

(56) References Cited

U.S. PATENT DOCUMENTS

| 6,469,991 | B1 * | 10/2002 | Chuah ........................ 370/329 |
| 6,930,984 | B1 | 8/2005 | Nomura et al. |
| 7,724,665 | B2 * | 5/2010 | Tanaka ....................... 370/235 |
| 7,933,249 | B2 * | 4/2011 | Amalfitano ................ 370/335 |
| 2003/0036408 | A1 * | 2/2003 | Johansson et al. ........... 455/560 |
| 2004/0085959 | A1 | 5/2004 | Ohkawa |
| 2004/0176098 | A1 | 9/2004 | Besset-Bathias et al. |
| 2004/0214602 | A1 * | 10/2004 | Aoyama ..................... 455/561 |
| 2005/0227698 | A1 * | 10/2005 | Nonin et al. .............. 455/452.2 |
| 2006/0187942 | A1 | 8/2006 | Mizutani et al. |
| 2007/0115906 | A1 * | 5/2007 | Gao et al. .................... 370/338 |
| 2007/0263818 | A1 | 11/2007 | Sumioka et al. |
| 2008/0081632 | A1 * | 4/2008 | Malik ........................ 455/452.1 |
| 2008/0220819 | A1 * | 9/2008 | Ben-Eli ....................... 455/561 |
| 2008/0280623 | A1 * | 11/2008 | Danne et al. ................. 455/453 |
| 2008/0318589 | A1 * | 12/2008 | Liu et al. ..................... 455/453 |
| 2009/0075667 | A1 * | 3/2009 | Bourlas ..................... 455/452.1 |
| 2009/0262698 | A1 * | 10/2009 | Suga ........................... 370/329 |

FOREIGN PATENT DOCUMENTS

| JP | A 11-32377 | 2/1999 |
| JP | A 2000-209267 | 7/2000 |
| JP | 2001-78247 | 3/2001 |
| JP | 2002-505065 | 2/2002 |
| JP | 2003-70054 | 3/2003 |

(Continued)

*Primary Examiner* — Kamran Afshar
*Assistant Examiner* — Khawar Iqbal
(74) *Attorney, Agent, or Firm* — Greer, Burns & Crain, Ltd.

(57) ABSTRACT

There is provided a base station apparatus which allocates communication bands for terminal units from an available communication band, and performs wireless communications with the terminal units using the allocated communication bands, including: a priority table storing priority information used for deriving a priority of the communication; a detecting part detecting a situation change concerning the communications; a band derivation part deriving communication bands required for the communications with terminal units to communicate, when the detecting part detects the situation change; a priority derivation part deriving priorities of the communications with the terminal units on the basis of the priority information stored in the priority table; and an allocating part allocating the communication bands derived by the band derivation part for the wireless communications with the terminal units in the order of descending priorities derived by the priority derivation part.

7 Claims, 14 Drawing Sheets

FOREIGN PATENT DOCUMENTS

| | | |
|---|---|---|
| JP | A 2003-333050 | 11/2003 |
| JP | A 2004-535747 | 11/2004 |
| JP | A 2004-356855 | 12/2004 |
| JP | A 2006-237678 | 9/2006 |
| JP | 2007-43310 | 2/2007 |
| JP | A 2007-274577 | 10/2007 |

* cited by examiner

F I G. 5

| DATA SOURCE | | DATA DESTINATION | | USAGE BAND (kbps) | COMMUNICATION STATE |
|---|---|---|---|---|---|
| IP ADDRESS | PORT NUMBER | IP ADDRESS | PORT NUMBER | | |
| 192.168.254.10 | 54321 | 192.168.254.11 | 12345 | 8 | IN COMMUNICATION |
| 192.168.254.11 | 65432 | 192.168.254.10 | 12345 | 64 | IN COMMUNICATION |
| ... | ... | ... | ... | ... | ... |

FIG. 6A

| TYPE (MEDIA) | TELEPHONE COMMUNICATION | PAY VIDEO IMAGE | FREE VIDEO IMAGE |
|---|---|---|---|
| SCORE | 20 | 10 | 0 |

FIG. 6B

| ATTRIBUTE OF TERMINAL UNIT | EXECTIVE | ADMINIS-TRATOR | REGULAR EMPLOYEE |
|---|---|---|---|
| SCORE | 20 | 10 | 0 |

FIG. 6C

| IMPORTANCE OF COMMUNI-CATION | EMERGENCY COMMUNI-CATION | COMMUNI-CATION FOR CUSTOMER | INTER-OFFICE COMMUNICATION |
|---|---|---|---|
| SCORE | 20 | 10 | 0 |

FIG. 7

| TYPE (MEDIA) | NO LIMITATION | LIMIT 1 | LIMIT 2 |
|---|---|---|---|
| TELEPHONE COMMUNICATION | CODING FORMAT 1 (64kbps) | CODING FORMAT 2 (8kbps) | TEMPORARY INTERRUPTION |
| PAY VIDEO IMAGE | CODING FORMAT 1 (2Mbps) | TEMPORARY INTERRUPTION | — |
| FREE VIDEO IMAGE | CODING FORMAT 1 (2Mbps) | CODING FORMAT 1 (1Mbps) | TEMPORARY INTERRUPTION |
| ... | ... | ... | ... |

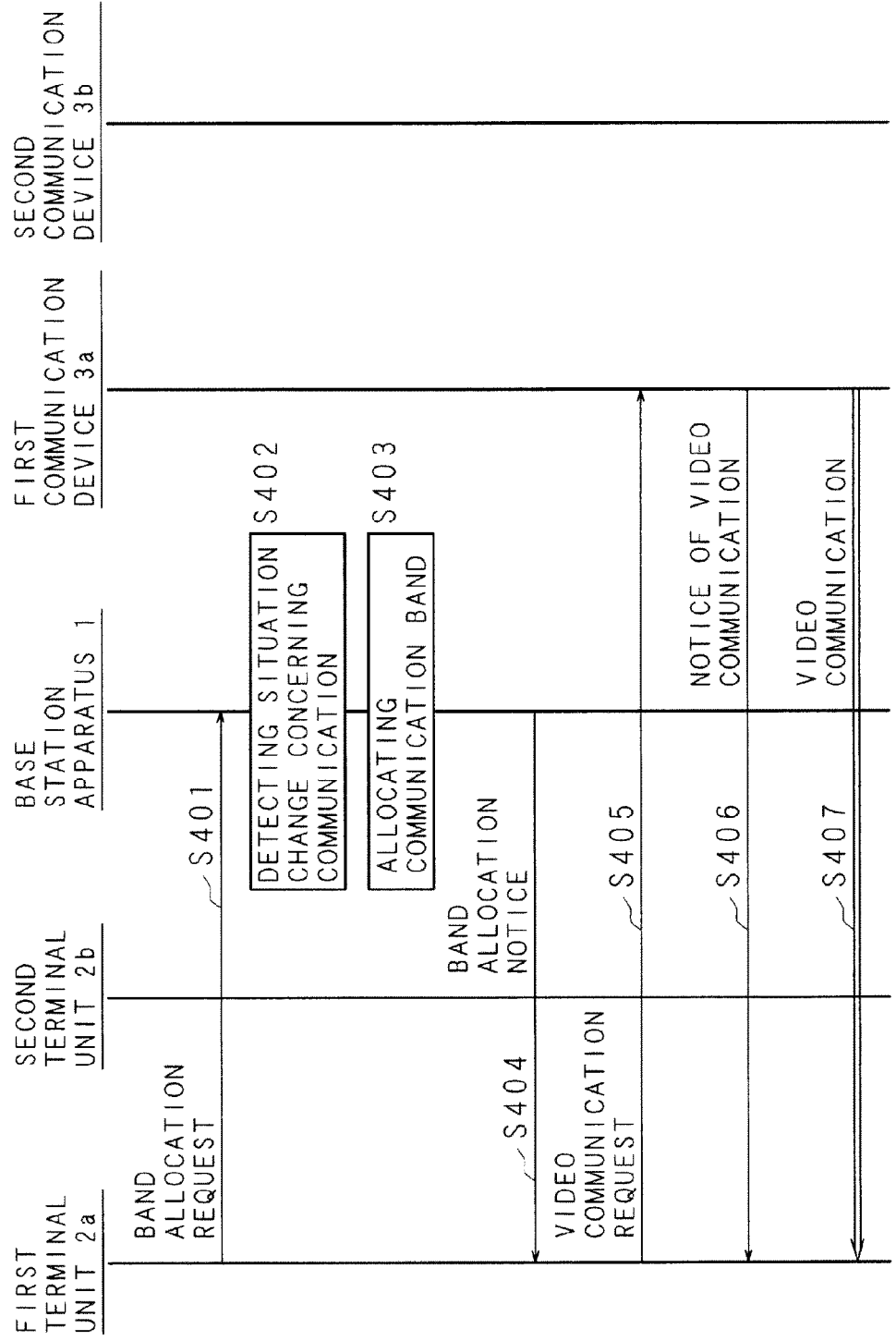

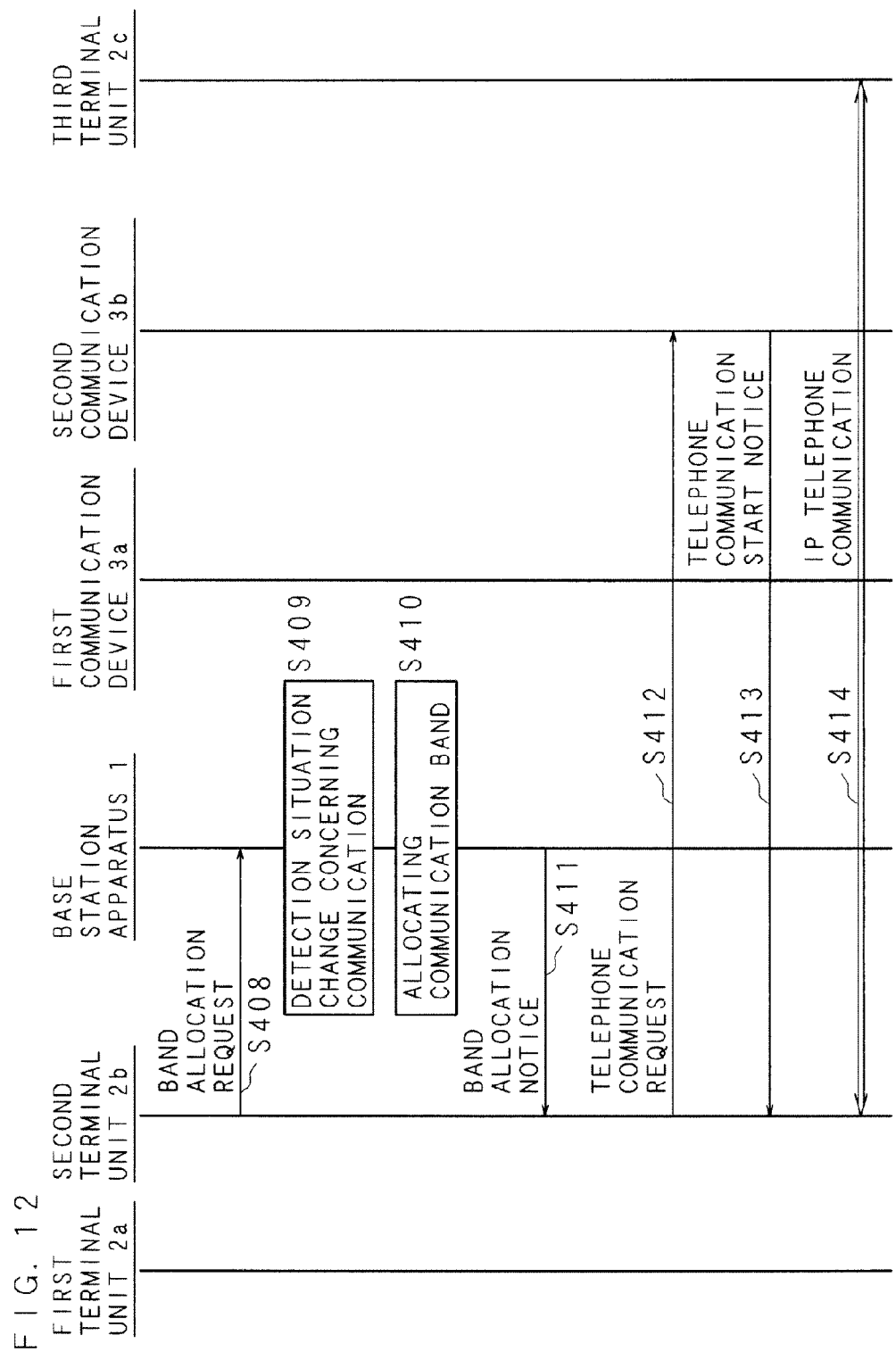

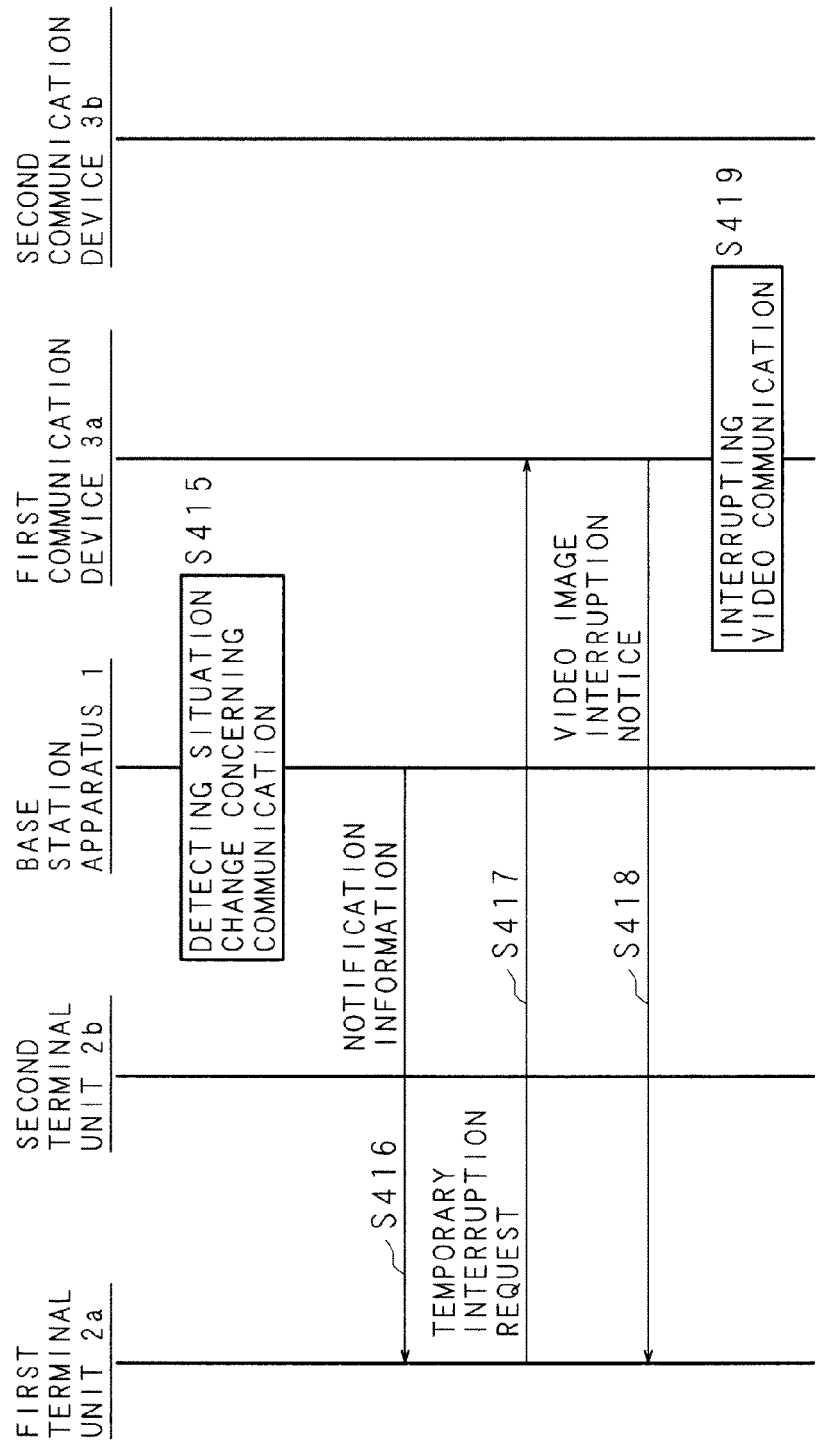

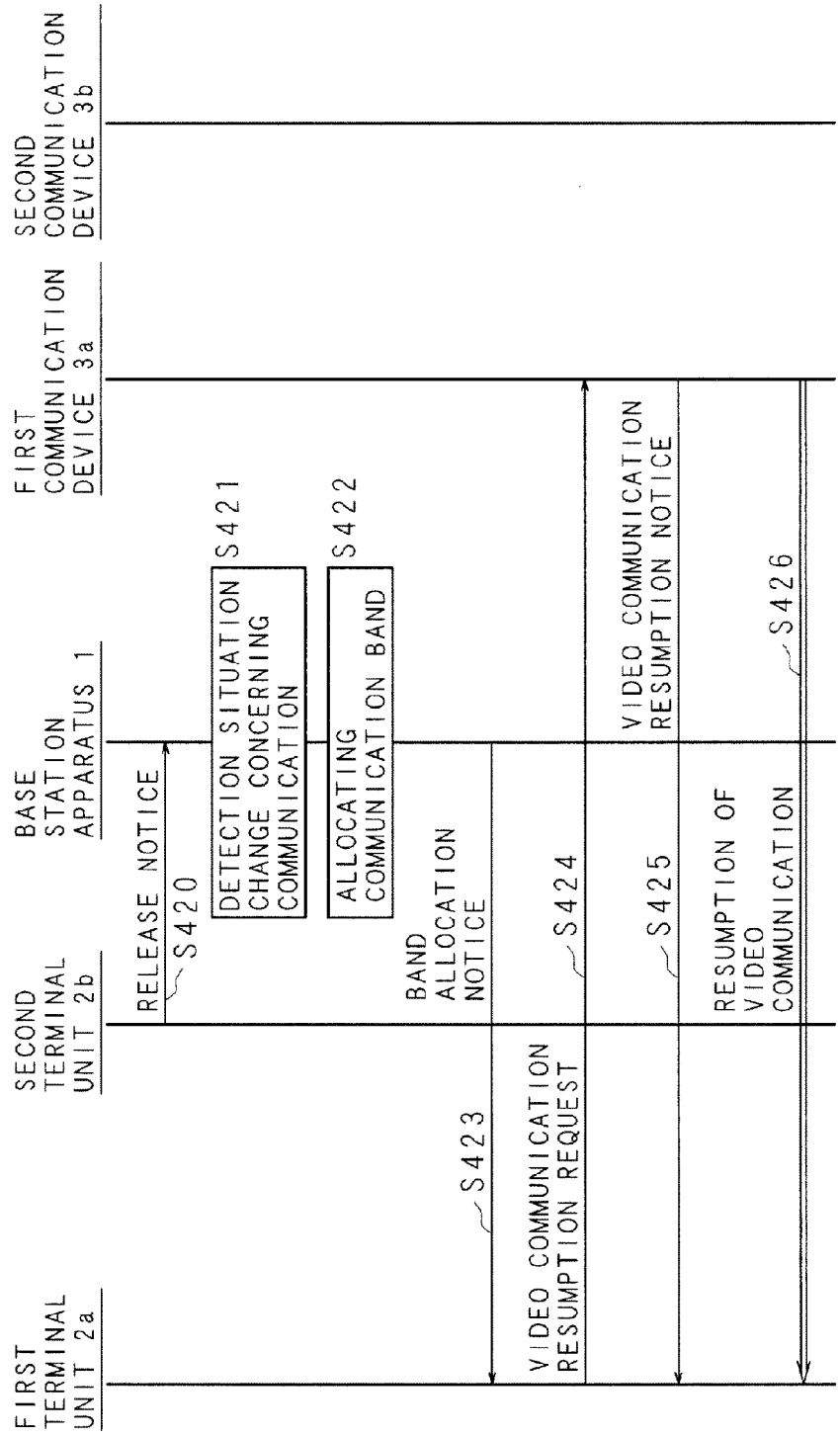

BASE STATION APPARATUS, COMMUNICATION SYSTEM AND COMPUTER PROGRAM

This application is a continuation, filed under 35 U.S.C. §111(a), of PCT International Application No. PCT/JP2007/057125 which has an international filing date of Mar. 30, 2007 and designated the United States of America.

FIELD

The embodiment discussed herein relates to a base station apparatus which allocates communication bands to terminal units from an available communication band and performs wireless communications with the terminal units using the allocated communication bands, a communication system using the base station apparatus, and a computer program to realize the base station apparatus. Particularly, the embodiment discussed herein relates to a base station apparatus which performs communication control according to a communication state when the communication state is changed, a communication system using the base station apparatus, and a computer program to realize the base station apparatus.

BACKGROUND

In recent years, various wireless communication networks are spreading rapidly in ordinary homes and companies. Particularly, not only voice streaming service of the portable IP phone or the like using a wireless LAN, but also image streaming service such as IPTV are also attracting attention lately.

In a communication system utilizing the wireless communication such as wireless LAN, the same electric wave arrives to a plurality of terminal units existing in a range to which the electric wave from the base station apparatus called an access point reaches. The base station apparatus controls so that the electric waves from the plurality of terminal units may not collide with each other using Carrier Sense Multiple Access with Collision Avoidance (CSMA/CA) to thereby share the communication bands among the plurality of terminal units and achieve the communication with the plurality of terminal units.

In the wireless LAN, a situation in accordance with the communication changes with time due to factors, such as an obstacle on a communication path, a distance between the base station apparatus and the terminal unit, and a new communication request from the terminal unit.

When the communication state between the base station apparatus and terminal unit gets worse, a link rate which is a bit rate between the base station apparatus and terminal unit is gradually reduced to thereby keep communication quality. In order to reduce the link rate, however, the base station apparatus needs to ensure sufficient communication bands for the communication with the terminal unit. Naturally when the sufficient communication bands may not be ensured for the communication with the other terminal units, the base station apparatus terminates the communication with this terminal unit.

In addition, since streaming service of media, such as voices, images, or the like is uniformly set to have priorities, the base station apparatus substantially allocates the communication bands in the order of arrival, and starts the wireless communications for a communication request of the streaming service.

A method of properly controlling the communication bands to be allocated for every session in the network where various communication services are provided is disclosed in Patent Document 1.

[Patent Document 1] Japanese Laid-Open Patent Publication No. 2006-237678

SUMMARY

According to the method in which the base station apparatus terminates the communication with the terminal unit between which the communication state got worse, however, there is a problem that there is a possibility of causing damage due to a lengthy delay of information transmission. For example, even when an executive in a company is calling to transmit urgent and important matters to a customer, the communication will be forcedly terminated.

Further, even when the communication that was forcedly terminated is attempted to reestablish, for example, the base station apparatus allocates the communication bands in the order of arrival, so that there is a problem that it is difficult to resume the communication regardless of the contents to be transmitted.

Incidentally, the method described in Patent Document 1 may not be applied to the wireless communications in which the communication state easily changes, since it discloses a technology in accordance with the control of the communication bands for a wired connection, such as ADSL or the like.

There is provided a base station apparatus in accordance with an aspect, which allocates communication bands from an available communication band to terminal units, and performs wireless communications with the terminal units using the allocated communication bands, including: a detecting part detecting a priority table which records priority information used for derivation of priorities of the communications and situation changes concerning the communications; a band derivation part deriving communication bands required for the communications with terminal units to be communicates, when the detecting part detects the change; a priority derivation part deriving the priorities of the communications with the terminal units based on the priority information recorded on the priority table; an allocating part allocating the communication bands derived by the band derivation part for the wireless communications with the terminal units in the order of descending priorities derived by the priority derivation part; a judging part judging whether or not a total of the communication bands which are required for the communications with the terminal units and are derived by the band derivation part exceeds an available communication band; and a limiting part temporarily limiting the communications of the terminal units in the order of ascending priorities derived by the priority derivation part, when the total of the required communication bands is judged to exceed the available communication band.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a view for explaining an example of recorded contents of a communication management table provided in the base station apparatus of the embodiment;

FIG. 6A, FIG. 6B and FIG. 6C are views for explaining an example of recorded contents of a priority table provided in the base station apparatus of the embodiment;

FIG. 7 is a view for explaining an example of recorded contents of a limitation table provided in the base station apparatus of the embodiment;

FIG. 11 is a sequence diagram illustrating an implementation example of the communication system of the embodiment;

FIG. 12 is a sequence diagram illustrating the implementation example of the communication system of the embodiment;

FIG. 13 is a sequence diagram illustrating the implementation example of the communication system of the embodiment; and FIG. 14 is a sequence diagram illustrating the implementation example of the communication system of the embodiment.

DESCRIPTION OF EMBODIMENTS

Figure 1:
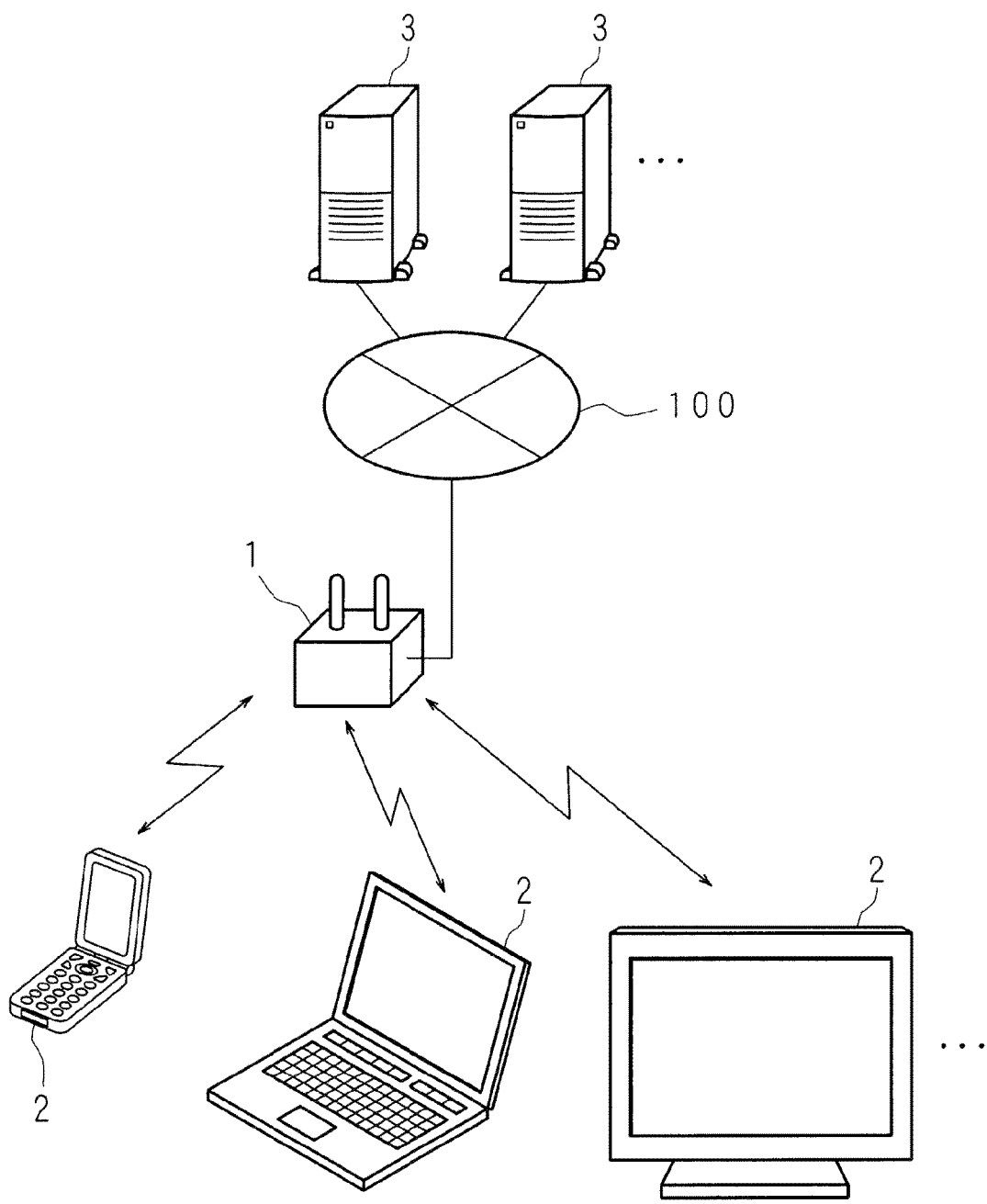
FIG. 1 is a view for explaining an example of a constitution of a communication system of one embodiment.

Hereinafter, one embodiment will be described in full detail based on the drawings. In FIG. 1, reference numeral 1 represents a base station apparatus of the embodiment using a communication computer which relays wireless communications as an access point, and the base station apparatus 1 performs the wireless communications with a plurality of terminal units 2, 2, . . . , such as a portable IP phone, a wireless IP videophone, a personal computer corresponding to wireless LAN, IPTV or the like through a mode such as a CSMA/CA mode or the like. The base station apparatus 1 is also connected with communication devices 3, 3, . . . , through a communication network 100, such as the Internet, an exclusive IP network, or the like using a stream server computer which communicates based on a protocol, such as Session Initiation Protocol (SIP), or the like for managing the wireless communications with the terminal units 2, 2, . . . , and the communication devices 3, 3, . . . , identify respective communications to be an management target, with communication identifiers to thereby manage them. the wireless LAN is then realized between the base station apparatus 1 and the terminal units 2, 2, . . . , based on the management of the communication devices 3, 3, . . . , and through the wireless LAN, the communication devices 3, 3, . . . , provides the terminal units 2, 2, . . . , with various services, such as service of distributing the streaming data that reproduces images and/or voices, and service of transmitting/receiving the streaming data to relay telephonic communications, such as VoIP or the like. Although each of the communication devices 3, 3, . . . , provides different services, respectively, a plurality of services may be provided by one communication device 3.

In the wireless LAN, the base station apparatus 1 is able to dynamically allocate a share of the communication bands to each of the terminal units 2, 2, . . . , respectively, and a plurality of terminal units 2, 2, . . . , simultaneously perform the communications with the base station apparatus 1 using respectively allocated communication bands.

Figure 2:
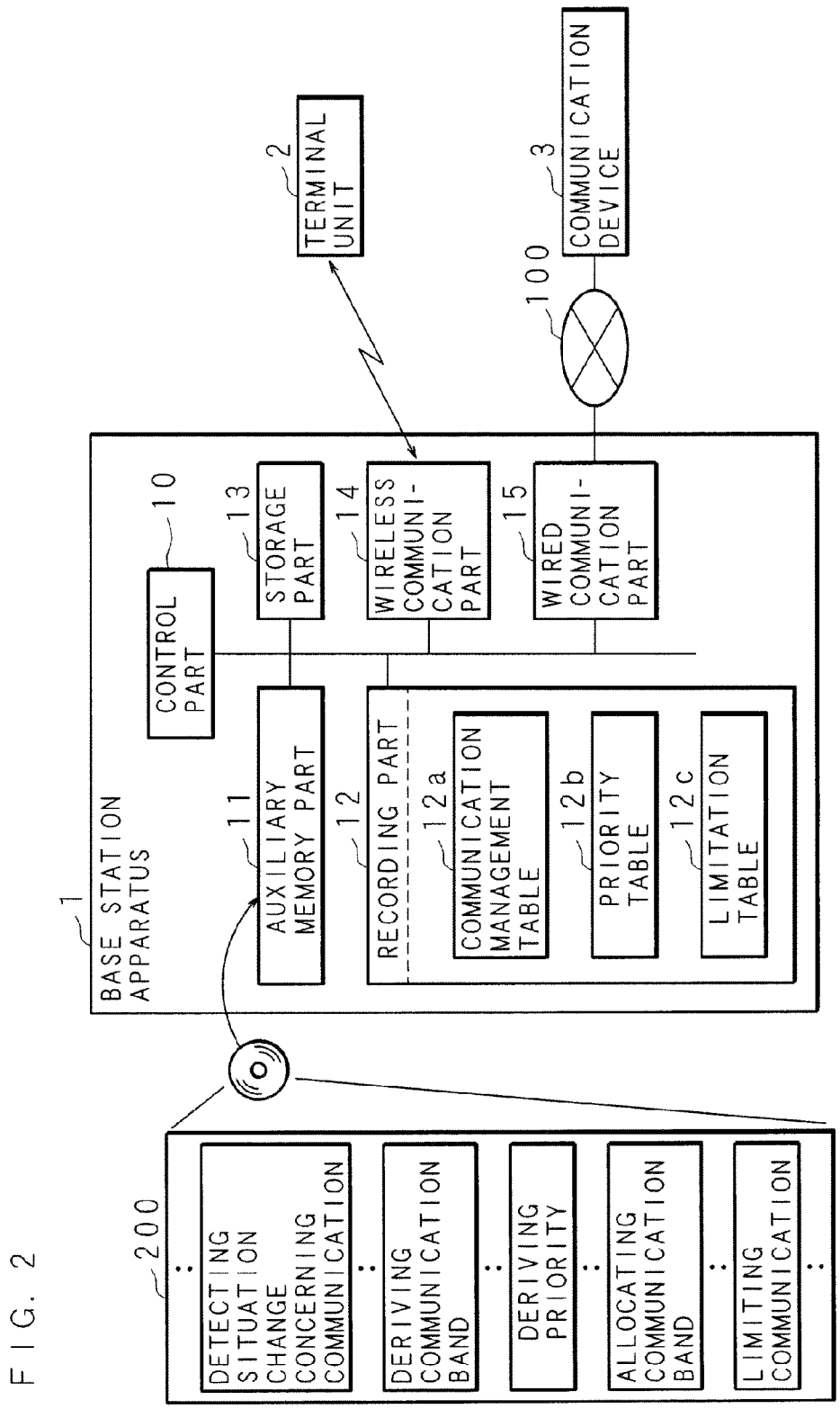
FIG. 2 is a block diagram illustrating a constitutional example of hardware of each device provided in the communication system of the embodiment.
Figure 3:
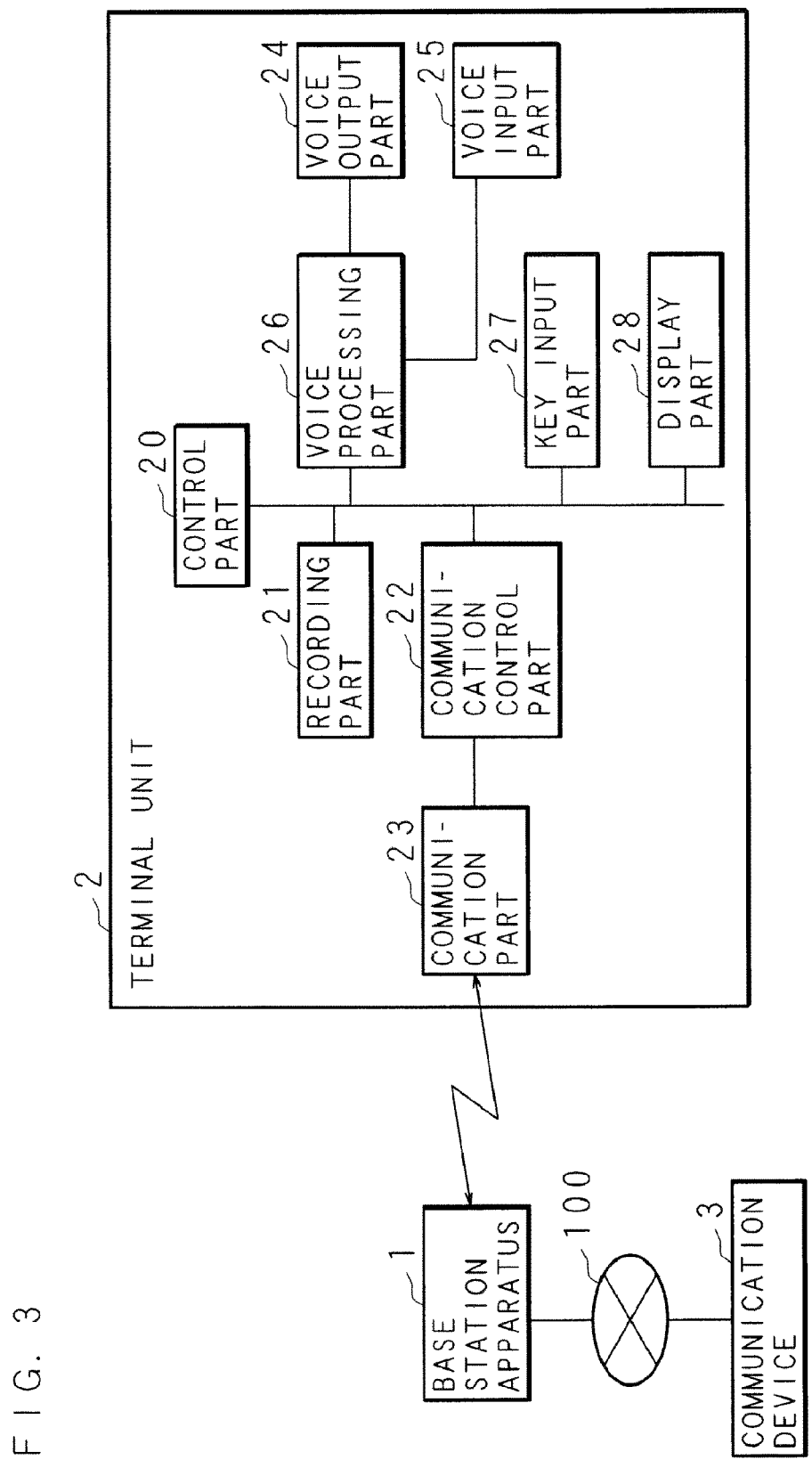
FIG. 3 is a block diagram illustrating the constitutional example of the hardware of each device provided in the communication system of the embodiment.

FIG. 2 and FIG. 3 are block diagrams illustrating constitutional examples of hardware of each device provided in the communication system of the embodiment. FIG. 2 mainly illustrates the base station apparatus 1, and FIG. 3 mainly illustrates the terminal unit 2. The base station apparatus 1 is provided with a control part 10, such as CPU or the like controlling the whole device, an auxiliary memory part 11, such as a CD-ROM drive or the like which reads a variety of information from recording media, such as CD-ROM or the like which records a computer program 200 of the embodiment, and a variety of information such as data or the like, a recording part 12 such as a hard disk or the like which records a variety of read information, and a storage part 13 such as RAM or the like which temporarily stores information. The communication computer operates as the base station apparatus 1 of the embodiment by reading the computer program 200 of the embodiment and a variety of information such as data or the like from the recording part 12, storing them in the storage part 13 such as RAM or the like which temporarily stores the information to execute a various procedures included in the computer program 200 by the control part 10. The base station apparatus 1 is further provided with a wireless communication part 14 which performs the wireless communications with the terminal units 2, 2, . . . , and a wired communication part 15 which performs wired communication with the communication device 3.

A communication management table 12a which records communication identification information required for the communications with each of the terminal units 2, 2, . . . , a priority table 12b which records priority information used for derivation of priorities of the communications with each of the terminal units 2, 2, . . . , a limitation table 12c which records a limiting method of the communications are recorded in the recording part 12 of the base station apparatus 1.

A constitution in which a portable IP phone is used as the terminal unit 2 is illustrated in FIG. 3. The terminal unit 2 is provided with a control part 20 which controls the whole device, and a recording part 21 such as ROM, RAM, or the like, which records the computer program and information such as data and the like required for various processing. Further, the control part 20 controls a communication control part 22 which controls the communications, and the communication control part 22 controls a communication part 23 such as an antenna, its attached circuit, and the like which transmits and receives the data of the digital signal and the like required for telephone communications. In addition, the control part 20 controls a voice processing part 26 which performs conversion processing of an analog voice signal outputted from a voice output part 24, such as a loud speaker or the like, and an analog voice signal inputted from a voice input part 25, such as a microphone or the like. The conversion processing by the voice processing part 26 is processing to change digital signals into analog voice signals to be outputted from the voice output part 24, and processing to change digital signals into analog voice signals based on the voice inputted from the voice input part 25. Further, the terminal unit 2 receives an input from a key input part 27, such as a push button or the like which receives a key input of alphanumeric characters, various commands, and the like based on the control of the control part 20, and displays required information on a display part 28, such as a liquid crystal display or the like, which displays varieties of information, such as the inputted information, television images based on the streaming data, and the like.

Figure 4:
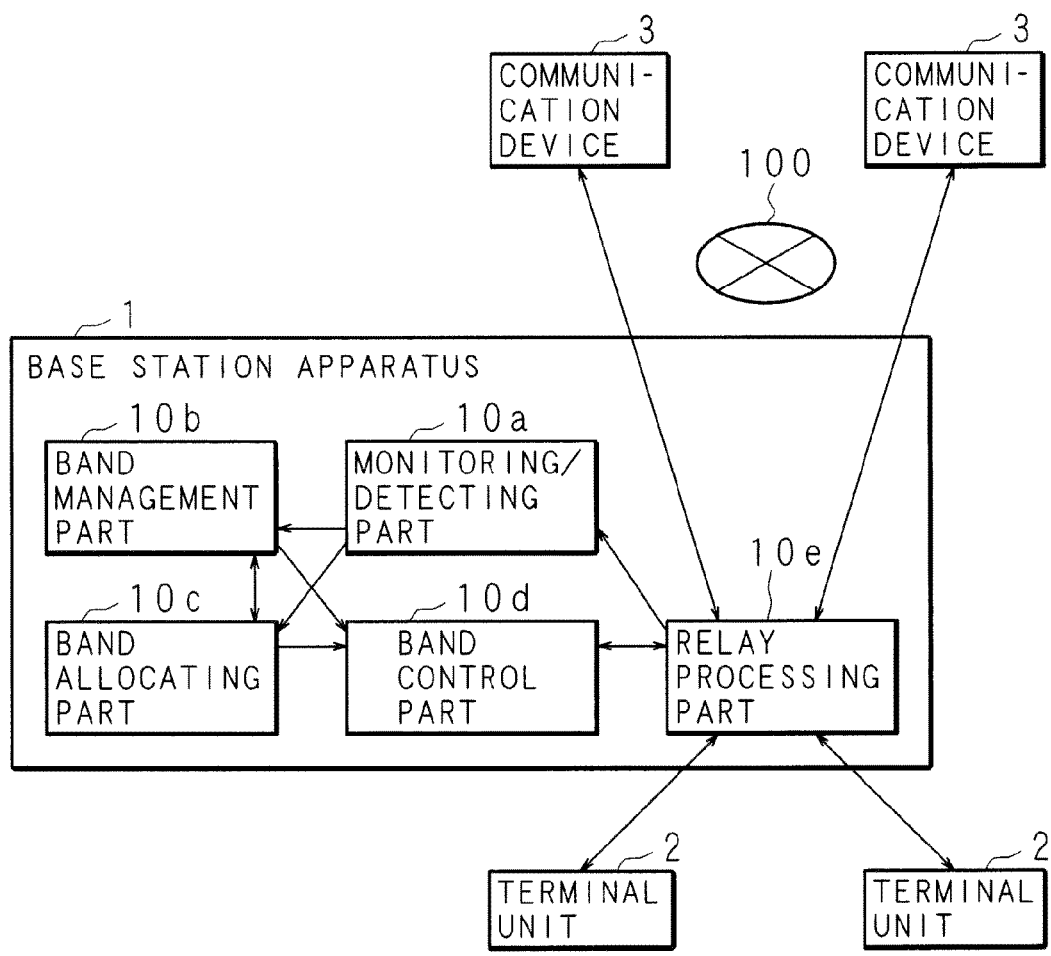
FIG. 4 is a functional block diagram illustrating an example of a function of a base station apparatus provided in the communication system of the embodiment.

FIG. 4 is a functional block diagram illustrating an example of functions of the base station apparatus 1 provided in the communication system of the embodiment. The base station apparatus 1 of the embodiment executes the computer program 200 of the embodiment by the control part 10 to thereby monitor a situation concerning the communications with each of the terminal units 2, 2, . . . , and executes various program modules which function as a monitoring/detecting part 10a which detects the situation changes concerning the communications, a band management part 10b which judges whether or not the derivation of the communication bands required for the communications with each of the terminal units 2, 2, . . . , and a total of the derived communication bands exceeds an available communication band, a band allocating part 10c which allocates the communication bands to each of the terminal units 2, 2, . . . , a band control part 10d which controls, limits, and resumes the communications based on the allocated bands, and a relay processing part 10e which relays data between the communication device 3 and the terminal units 2, 2, . . . , .

As illustrated in FIG. 5, in the communication management table 12a, varieties of information, such as communication identification information which identifies the terminal unit 2 to be data source and destination, usage bands, communicating states, and the like are recorded as a record in which they are associated with each other. IP addresses and port numbers are indicated as the communication identification information. The usage band indicates the communication band allocated to the communication as a communication rate. The communicating state indicates states, such as a temporary interruption and the like during the communication. The recorded contents of the communication management table 12a illustrated in FIG. 5 describes situations of connecting with the base station apparatus 1 at the communication rate of 8 kbps in which a first terminal unit 2 allocated "192.168.254.10" as its IP address uses a receive port whose port number is "12345" and a transmit port whose port number is "54321"; connecting with the base station apparatus 1 at the communication rate of 64 kbps in which a second terminal unit 2 allocated "192.168.254.11" as its IP address uses a transmit port whose port number is "65432" and a receive port whose port number is "12345"; and relaying the communications between the first terminal unit 2 and the second terminal unit 2 by the base station apparatus 1. Moreover, the recorded contents of the communication management table 12a will be successively updated.

As illustrated in FIG. 6A, FIG. 6B and FIG. 6C, in the priority table 12b, various items such as types of information to be communicated (media), attributes of the terminal unit 2 to be communicated, importance of the communications, and the like are recorded while being associated with scores. FIG. 6A illustrates the scores which are set to the types of information to be communicated, "20" is set to the telephone communications, "10" is set to the pay video images, and "0" is set to the free images, respectively. FIG. 6B illustrates the scores which are set to attributes indicating user's posts as the attributes of the terminal unit 2, "20" is set to an executive, "10" is set to an administrator, and "0" is set to a regular employee, respectively. FIG. 6C illustrates the scores which are set based on contents, such as parts to be communication partners, emergency of the communications, or the like, as the information to represent the importance of the communication, "20" is set to emergency communications, "10" is set to communications for customers, and "0" is set to inter-office communications, respectively. The examples illustrated in FIG. 6A, FIG. 6B and FIG. 6C are mere examples, and the priority information of various items may be set in business parts, such as companies or the like which attempt to introduce the communication system of the embodiment, and may be scored.

As illustrated in FIG. 7, in the limitation table 12c, setup of a method of limiting the communications is recorded while being associated with the types of the information (media). As for the telephone communications, a coding format 1 (64 kbps) is set as having no limitation; a coding format 2 (8 kbps), as the limit 1; and a temporary interruption, as the limit 2. The coding format 1 and the coding format 2 indicate a coding format (CODEC) indicating compression encoding at the time of the communications, and an expression inside the parenthesis indicates the communication band to be used as the communication rate. The temporary interruption indicates that the communication is interrupted temporarily, and the temporary interruption of the telephone communications indicates that a telephone call is kept in holding state. As for the pay video images, a coding format 1 (2 Mbps) is set as having no limitation, and the temporary interruption is set as the limit 1. The temporary interruption of the communication in accordance with the images, such as pay video images, free images, or the like indicates that the images are suspended in a state of pause.

Figure 8:
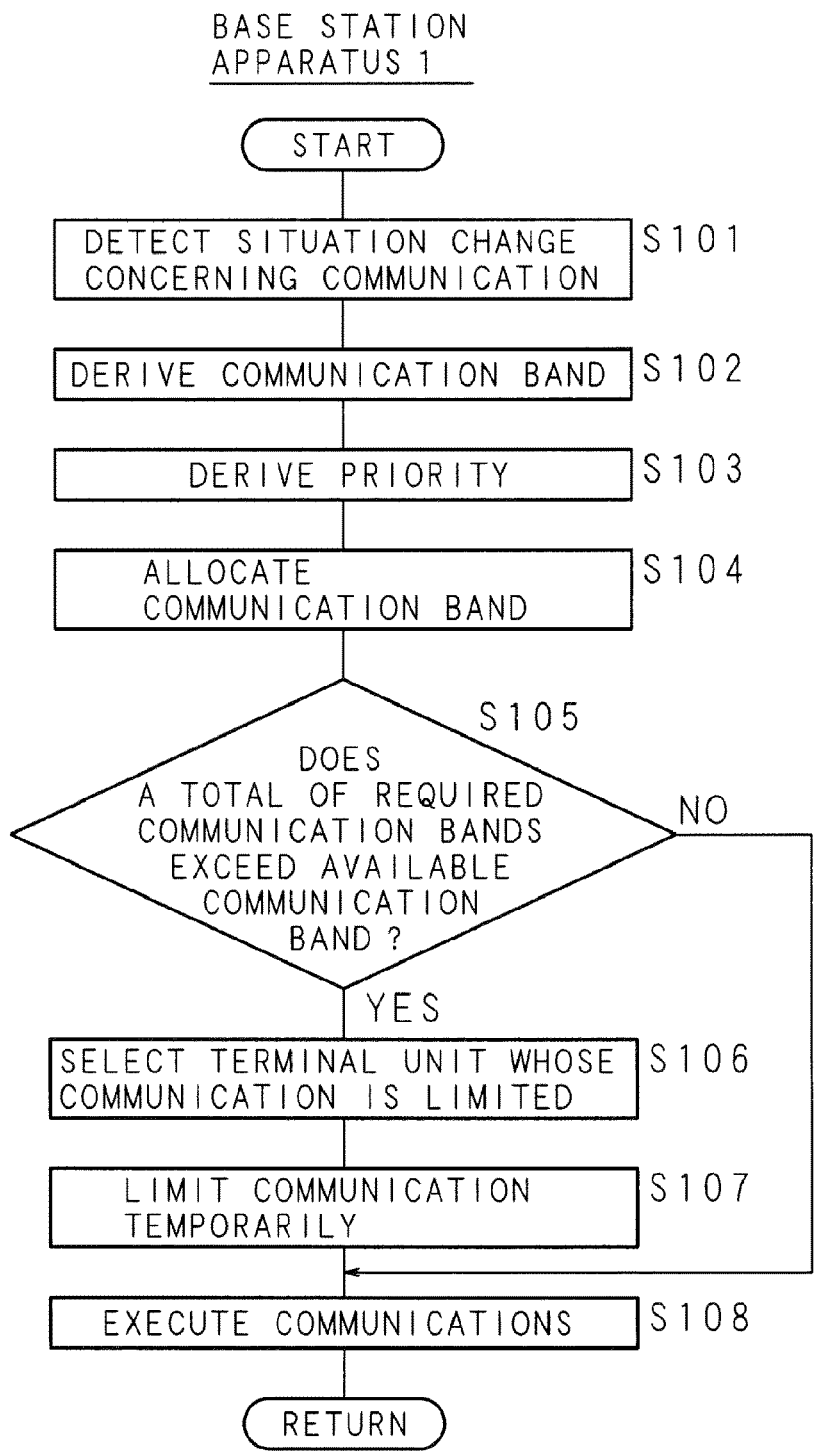
FIG. 8 is an operation chart illustrating an example of band allocation processing of the base station apparatus of the embodiment.

Next, processing of each part that the communication system of the embodiment is provided with will be described. FIG. 8 is an operation chart illustrating an example of band allocation processing of the base station apparatus 1 of the embodiment. The base station apparatus 1 detects the situation changes concerning the communications, by the processing of the monitoring/detecting part 10a based on the control of the control part 10 which executes the computer program 200 stored in the storage part 13 (at S101). At step S101, the monitoring/detecting part 10a always monitors the situation of the communications, and detects the situation changes, such as deterioration and/or improvement of the communication environment, requests of new communications, termination of the established communications, and the like. The communication environment changes with various factors such as a distance between the base station apparatus 1 and the terminal unit 2, a shelter such as walls, pillars, and the like which interrupts the communications between the base station apparatus 1 and the terminal unit 2, electromagnetic waves of the other wireless communications, electromagnetic waves serving as disturbance factors, such as electromagnetic waves or the like leaking from a microwave oven, or the like. For example, if the communication environment gets worse, a missing rate and a resending rate of a packet will be increased, so that the monitoring/detecting part 10a may detect the situation changes concerning the communications by monitoring the missing rate of the packet. It is to be noted that when commands about connection or disconnection of the communications, such as a connection establishment request, a disconnection request or the like from the terminal unit 2 are detected, it also detects the situations concerning the communications being changed.

When the situation changes concerning the communications are detected, the base station apparatus 1 derives the communication bands required for the communications with each of the terminal units 2, 2, . . . , to be communicated, by the processing of the band management part 10b based on the control of the control part 10 (at S102). At Step S102, the communication bands not only for the terminal units 2, 2, . . . , being connected, but also for the terminal unit 2 which has request new communication and the terminal unit 2 whose communication is temporarily interrupted by processing described below are derived. It is to be noted that at this stage, a communication band which is required for the communications as having no limitation in the limitation table 12c illustrated in FIG. 7 is defined as a required communication band.

The base station apparatus 1 derives the priorities of the communications with each of the terminal units 2, 2, . . . , based on the priority information recorded on the priority table 12b, by the processing of the band management part 10c based on the control of the control part 10 (at S103). The priority derivation at step S103 is derived by computing a total score previously set as the priority information, for each of the terminal units 2, 2, . . . , based on the priority table 12b. For example, in a case of the priority table 12b illustrated in FIG. 6A, FIG. 6B and FIG. 6C, when the executive is performing the telephone communications with the customer, the score will be "20" for the telephone communications, "20" for the executive, and "10" for the communications with the customer, so that the total score "50" will be a priority derived for the communications of the terminal unit 2. In addition, when the regular employee is viewing the free images distributed in the company, the score will be "0" for the free image, "0" for the regular employee, and "0" for the inter-office communications, so that the total score of "0" will be a priority derived for the terminal unit 2.

The base station apparatus 1 allocates the communication bands derived at step S102 to the wireless communications with each of the terminal units 2, 2, . . . , in the order of descending priorities derived at step S103, by the processing of the band allocating part 10c based on the control of the control part 10 (at S104).

The base station apparatus 1 judges whether or not the total of the communication bands required for the communications with each of the terminal units 2, 2, . . . , derived at step S102 exceed the available communication band, by the processing of the band allocating part 10b based on the control of the control part 10 (at S105). If the total of the communication bands required for the communications is judged to exceed the available communication band at step S105 (at S105: YES), the base station apparatus 1 selects the terminal units 2, 2, . . . , whose communications are temporarily limited in the order of ascending priorities derived at step S103 (at S106), and temporarily limits the communications of the selected terminal units 2, 2, . . . , by the processing of the band control part 10d based on the control of the control part 10 (at S107). Step S106 is processing of selecting the terminal units 2, 2, . . . , to be excepted so that the total of the communication bands required for the communications may be within the available communication band, and it temporarily limits the communications of the selected terminal units 2, 2, . . . , at step S107. The base station apparatus 1 then executes the communications within the communication bands allocated to the terminal units 2, 2, . . . , at step S104, in a state of temporarily limiting communication at step S107 of the terminal units 2, 2, . . . , selected at step S106, by the processing of the band control part 10d based on the control of the control part 10 (at S108). Subsequently, the base station apparatus 1 returns to step S101, and repeats the processing. The execution of the communications at step S108 is a release of the limit, such as continuation of the communications with the terminal units 2, 2, . . . , during the connection, start of the communication with the terminal unit 2 which has required new communication, and resumption of the communication with the terminal unit 2 whose communication is temporarily limited. The base station apparatus 1 relays the communications between the terminal units 2, 2, . . . , and the communication devices 3, 3, . . . , by the processing of the band control part 10d and the relay processing part 10e based on the control of the control part 10.

If the total of the communication bands required for the communications is judged not to exceed the available communication band at step S105 (at S105: NO), the base station apparatus 1 proceeds to step S108, by the control of the control part 10, and executes the communications within the communication bands allocated to each of the terminal units 2, 2, . . . , at step S104 (at S108).

Figure 9:
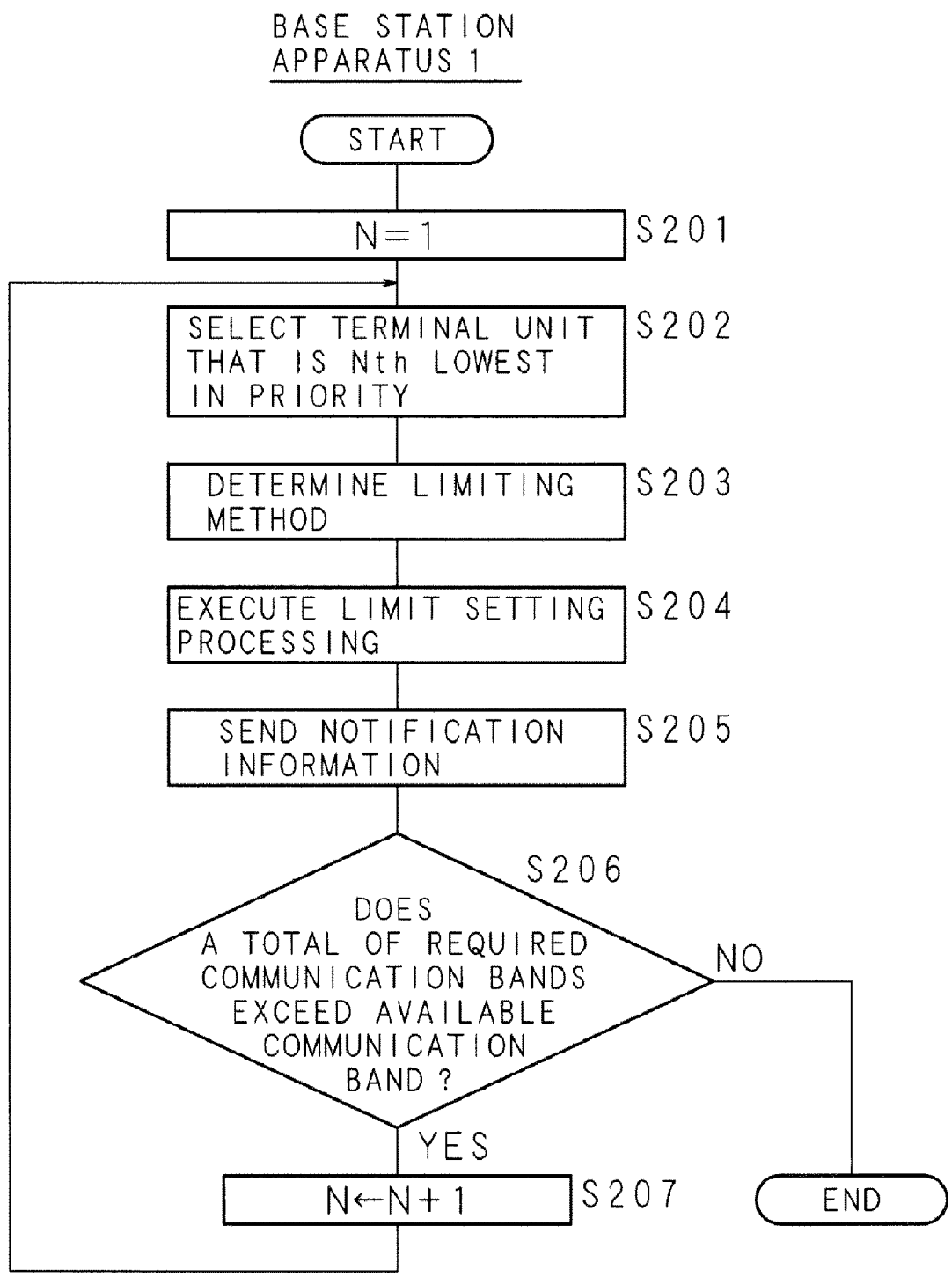
FIG. 9 is an operation chart illustrating an example of communication temporary limiting processing of the base station apparatus of the embodiment.

FIG. 9 is an operation chart illustrating an example of communication temporary limiting processing of the base station apparatus 1 of the embodiment. As for the communication temporary limiting processing, the processing of temporarily limiting, at step S107, the communications of the terminal units 2, 2, . . . , selected at step S106 of the band allocation processing will be described in more detail using FIG. 8. The base station apparatus 1 sets 1 to a counter N, by the control of the control part 10 (at S201).

The base station apparatus 1 selects an Nth terminal unit 2 from the order of the lowest priority derived at step S103, by the control of the control part 10 (at S202), and determines a limiting method of the selected terminal unit 2 based on the recorded contents of the limitation table 12c (at S203). For example, if the limitation table 12c illustrated in FIG. 7 is used, the limiting method is temporarily interrupted when the terminal unit 2 in which the type of the information to be communicated is the pay video images is selected as a target of the temporarily limiting processing. In addition, if the terminal unit 2 whose type of information to be communicated is the telephone communication is selected as the target of the temporarily limiting processing, whether or not the total of the communication bands required for the communications with each of the terminal units 2, 2, . . . , is settled within the available communication band is judged by changing the coding format and reducing the communication band to be used from 16 kbps to 8 kbps, and if it is judged to be settled, the limiting method results in a reduction of the communication bands, and if it is judged not to be settled, the limiting method results in the temporary interruption. It is to be noted that when coding format setting to be used is more than three stages, it is judged whether or not the total of the communication bands required for the communications is settled within the available communication band for each coding format.

The base station apparatus 1 executes limit setting processing to the terminal unit 2 selected at step S202 based on the limiting method determined at step S203, by the control of the control part 10 (at S204), and sends notification information for notifying that it is limited, to the limited terminal unit 2 (at S205). If the limiting method is determined to the temporary interruption, the limit setting processing at step S204 results in processing to record the IP address and the port number which are the communication identification information for identifying the terminal unit 2 on the communication management table 12a as a device interrupted temporarily. If the limiting method is determined to the reduction of the communication bands, the limit setting processing results in processing to record the reduced communication band on the communication management table 12a as the available band. At step S205, communication information to be notified to the terminal unit 2 as a control instruction and notification information displaying the message of "images are paused", for example when video communications are temporarily interrupted are sent.

The base station apparatus 1 judges whether or not the total of the communication bands required for the communications with each of the terminal units 2, 2, . . . , exceeds the available communication band by limiting the terminal unit 2 selected at step S202 by the method determined at step S203, by the control of the control part 10 (at S206).

If the total of the communication bands required for the communications is judged to exceed the available communication band at step S206 (at S206: YES), the base station apparatus 1 adds 1 to the counter N by the control of the control part 10 (at S207), and returns to step S202 to repeat subsequent processing.

If the total of the communication bands required for the communications is judged to exceed the available communication band at step S206 (at S206: NO), the base station apparatus 1 terminates the communication temporary limiting processing by the control of the band control part 10d based on the control of the control part 10. The selection of the terminal units 2, 2, . . . , and the communication limitation are performed by executing the communication temporary limiting processing in this way. It is to be noted that as for the method of the communication temporary limitation, it is not limited to the method described herein but it may be achieved by various methods, and for example, it is able to expand to various methods, such as reducing the communication bands of a plurality of terminal units 2, 2, . . . , so as to provide the priorities to the number of the terminal units 2, 2, . . . , to be communicated.

Figure 10:
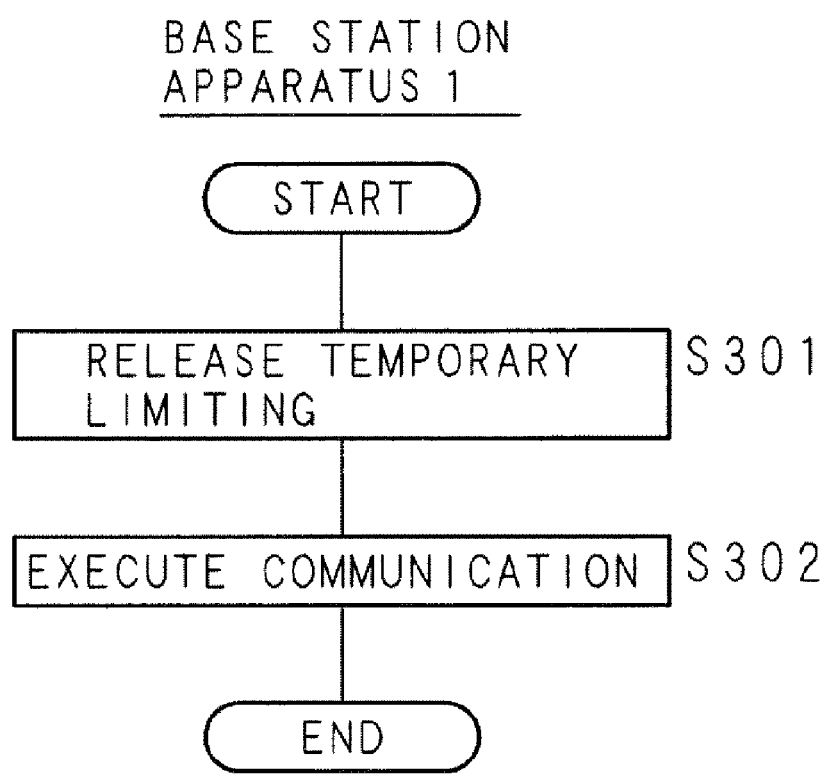
FIG. 10 is an operation chart illustrating an example of communication restoration processing of the base station apparatus of the embodiment.

FIG. 10 is an operation chart illustrating an example of a communication restoration processing of the base station apparatus 1 of the embodiment. As the communication restoration processing, a communication executing operation at step S108 of the band allocation processing described using FIG. 8 will be described in more detail. The base station apparatus 1 selects the temporarily limited terminal units 2, 2, . . . , among the terminal units 2, 2, . . . , which are the targets of communication execution, by the control of the control part 10, releases the limit of the selected terminal units 2, 2, . . . , whose communications are temporarily limited (at S301), and executes the communications (at S302). At step S301, the limit release processing to the terminal units 2, 2, . . . , whose communications are temporarily interrupted is processing of resuming the communications based on the IP address and the port number which are the recorded communication identification information. In addition, the limit release processing to the terminal unit 2 whose communication band is reducing is processing of returning to the original communication band.

A specific implementation example of the communication system of the embodiment will be described. FIG. 11 to FIG. 14 are sequence diagrams illustrating the implementation example of the communication system of the embodiment. The implementation example in FIG. 11 to FIG. 14 illustrates an example in which the communication environment got worse after starting the video communications and IP telephone communications. The example illustrates a case of the communication environment in which the video communications are getting worse, when the IP telephone communications and the video communications are performed. It is to be noted that for convenience of the description, the terminal unit 2 for video communications, which receives image and audio streaming data is assumed to be a first terminal unit 2a, and the terminal unit 2 for the IP telephone communications is assumed to be a second terminal unit 2b. Moreover, a video server computer which transmits the image and audio streaming data is assumed to be a first communication device 3a, and a SIP server computer which manages the IP telephone communications is assumed to be a second communication device 3b.

The first terminal unit 2a sends to the base station apparatus 1 a band allocation request which requires the band allocation for the video communications to assure the communication bands required for the video communications (at S401).

The base station apparatus 1 detects the situation changes of the communications by receiving the band allocation request (at S402), allocates the communication bands to the first terminal unit 2a according to the received band allocation request (at S403), and sends a band allocation notice for notifying that the communication band is allocated to the first terminal unit 2a (at S404). At step S402, the base station apparatus 1 detects the received band allocation request as the situation changes of the communications by the monitoring/detecting part 10a. Subsequently the base station apparatus 1 performs the allocation of the communication bands by the band management part 10b, the band allocating part 10c, and the band control part 10d. It is to be noted that the base station apparatus 1 judges that the communication bands required for the communications with the first terminal unit 2a does not exceed the available communication band at this stage to thereby allocate the requested communication band thereto.

The first terminal unit 2a sends the video communication request which requires the video communications to the first communication device 3a through the base station apparatus 1 using the allocated communication bands, based on the received band allocation notice (at S405).

The first communication device 3a sends the notice of the video communications, which notifies the start of the video communications in response to the received video communication request to the first terminal unit 2a through the base station apparatus 1 (at S406), and further starts the video communications which transmits the image and voice information as the streaming data (at S407).

The second terminal unit 2b sends the band allocation request which requires the band allocation for the IP telephone communications to assure the communication band need for the IP telephone communications to the base station apparatus 1 (at S408). It is to be noted that subsequent description will be made while assuming that the second terminal unit 2b has specified the third terminal unit 2c as a correspondence of the telephone communications. The base station apparatus 1 detects the situation changes of the communications by receiving the band allocation request (at S409), allocates the communication bands to the second terminal unit 2b according to the received band allocation request (at S410), and sends the band allocation notice for notifying that the communication band is allocated to the second terminal unit 2b (at S411). At step S409, the base station apparatus 1 detects the received band allocation request as the situation changes of the communications by the monitoring/detecting part 10a. Subsequently the base station apparatus 1 allocates the communication bands by the band management part 10b, the band allocating part 10c, and the band control part 10d. It is to be noted that the base station apparatus 1 judges at this stage that the communication bands required for the communications between the first terminal unit 2a and the second terminal unit 2b does not exceed the available communication band to thereby locates the requested communication bands thereto.

The second terminal unit 2b sends to the second communication device 3b through the base station apparatus 1 the IP telephone communication request which requires the IP telephone communications using the allocated communication band, based on the received band allocation notice (at S412).

The second communication device 3b sends to the second terminal unit 2b through the base station apparatus 1 a telephone communication start notice for notifying a start of the IP telephone communications in response to the received IP telephone communication request (at S413), and further starts the IP telephone communications with the third terminal unit 2c which will be a correspondence of the telephone communications with the second terminal unit 2b (at S414).

Subsequently, it is supposed that the communication environment concerning the video communications gets worse in a situation where the video communications and the IP telephone communications are performed. The base station apparatus 1 detects the situation changes of the communications (at S415), and sends a notice for notifying that the communications to the first terminal unit 2a will be temporarily interrupted (at S416). At step S415, the base station apparatus 1 detects deterioration of the communication environment as the situation changes of the communications by the detecting part 10a. Subsequently, the base station apparatus 1 allocates the communication bands by the band management part 10b, the band allocating part 10c, and the band control part 10d. Incidentally, it is supposed that the base station apparatus 1 judges at this stage that it is necessary to expand the available band allocated to the video communications in order to continue the video communications, due to the deterioration of the communication environment, judges that the total of communication bands required for the communications with the first terminal unit 2a and the second terminal unit 2b exceeds the available communication band, and judges that the video communications with a low priority is temporarily interrupted.

The first terminal unit 2a sends to the first communication device 3a through the base station apparatus 1 a temporary interruption request which requires the temporary interruption of the video communications, based on the received notification information (at S417).

The first communication device 3a sends to the first terminal unit 2a through the base station apparatus 1 an image interruption notice which interrupts the video communications, based on the received temporary interruption request (at S418), and interrupts the video communications (at S419). Thereby the communication bands used for the video communications are released.

It is supposed that the telephone call through the IP telephone communications is completed, and a hanging operation of the telephone call is performed in the second terminal unit 2b. The second terminal unit 2b sends to the base station apparatus 1 a release notice for indicating that the IP telephone communications are completed and the used communication band is released (at S420).

The base station apparatus 1 detects the situation changes of the communications by receiving the release notice (at S421), allocates the communication bands to the first terminal unit 2a according to the received release notice (at S422), and sends the band allocation notice for notifying that the communication band is allocated to the first terminal unit 2a (at S423). At step S421, the base station apparatus 1 detects the received release notice as the situation changes of the communications by the monitoring/detecting part 10a. Subsequently, the base station apparatus 1 performs the allocation of the communication bands by the band management part 10b, the band allocating part 10c, and the band control part 10d. It is to be noted that since the communication bands used by the second terminal unit 2b is released, the base station apparatus 1 judges at this stage that the total of the communication bands required for the communications with the first terminal unit 2a does not exceed the available communication band, and judges that the communications with the first terminal unit 2a may be the resumed to thereby allocates the communication bands used for the video communication.

The first terminal unit 2a sends to the first communication device 3a through the base station apparatus 1 a video communication resumption request which requires the resumption of the video communications using the allocated communication band, based on the received band allocation notice (at S424).

The first communication device 3a sends to the first terminal unit 2a through the base station apparatus 1 a video communication resumption notice for notifying the resumption of the video communications in response to the received video communication resumption request (at S425), and further resumes the video communications which transmits the image and voice information as the streaming data (at S426).

Although an example in which the video communications are temporarily interrupted when the communication environment gets worse is illustrated in the implementation example illustrated in FIG. 11 to FIG. 14, it may be dealt with by changing the coding format of the video communications to thereby reduce the communication band to be used as described above. Namely after detecting the situation changes of the communications at step S415, the coding format is changed to thereby reduce the communication bands to be used, and the reduced communication bands are notified at step S416. Subsequently after detecting the termination of the telephone communications at step S421, communication bands which are communicatable may be allocated in the original coding format at step S422.

In addition, it may be set so that information for reproducing given voice and/or images used as the notification information is transmitted from the first communication device 3a to the base station apparatus 1 after starting the video communications, and while recording the information on the base station apparatus 1, the recorded information is transmitted from the base station apparatus 1 to the first terminal unit 2a as the notification information upon temporarily interrupting the video communications at step S416. The information transmitted as the notification information during the interruption is information which indicates messages, for example still pictures, voice messages, simple animation images, indicating that pause will be performed.

The embodiment merely illustrates an embodiment which exists infinitely according to the present invention. The methods of, for example, the priority derivation method and the temporary limitation method may be properly set and may be expanded in various forms.

In the embodiment, the communication bands are allocated in the order of descending derived priorities for respective terminal units to be communicated. As a result, the communication bands may be allocated to the communications with important contents, regardless of the order of a communication request. Hence, it is able to prevent transmission of information on urgent and important contents from being delayed, and to realize the efficient allocation of the communication bands. Even when the required communication band may not be assured, communication with a low priority will not be terminated, but communication with a low priority will be temporarily limited. As a result, the communication may be resumed as soon as the communication state is improved. Hence, it is able to realize the efficient allocation of the communication bands which minimize the delay of the information transmission.

In the embodiment, the communication is interrupted as a temporary limit of the communication with a low priority. When the situation concerning the communications is improved, the communication will be then resumed. As a result, it is able to realize the efficient allocation of the communication bands which minimize the delay of the information transmission.

In the embodiment, communication identification information concerning upper level layers, such as an IP address, a port number, and the like required for the communication is maintained. As a result, it is able to resume the interrupted communication.

In the embodiment, image quality is reduced by changing a coding format, for example, by increasing compression ratio, as the temporary limit of the communication with a low priority. As a result, it is able to reduce a communication load and to realize the efficient allocation of the communication bands.

In the embodiment, the user who uses the terminal unit is able to know reasons why situations, such as interruption, deterioration of image quality or the like have happened.

In the embodiment, it is able to derive multi-stage priorities to which various factors are added.

In the base station apparatus, the communication system, and the computer program in accordance with the aforementioned embodiment, the communication bands are allocated to a plurality of terminal units in an available communication band, respectively, and are applied to the base station apparatus or the like which perform wireless communications with each of the terminal units using the allocated communication band. The base station apparatus monitors the situation concerning the communications. The base station apparatus may detect changes of the situation, such as results of this monitoring, deterioration of a communication environment, requests of new communications, termination of the established communications, or the like. The base station apparatus executes following processes, when the situation changes are detected. One is processing for deriving the communication bands required for the communications with terminal units to be communicated, such as a terminal unit which has already established the communication, and a terminal unit which has required the communication. One is processing for deriving the multi-stage priorities of the communications with each of the terminal units based on priority information of a plurality of items previously set. One is processing for allocating the required communication bands to the wireless communications with each of the terminal units in the order of descending priorities. One is processing for temporarily limiting the communications with terminal units in the order of ascending priorities, when a total of communication bands required for the communications with each of the terminal units exceeds the available communication band.

According to this configuration, the communication bands may be preferentially allocated to the communications of important contents, regardless of the order of the communication request in the aforementioned embodiment. As a result, it is able to prevent the transmission of the information on the urgent and important contents from being delayed, and to realize the efficient allocation of the communication bands. According to this configuration, these excellent effects are proven in the aforementioned embodiment. Moreover, in the aforementioned embodiment, the communication with a low priority may not be terminated when the required communication band may not be assured. Meanwhile, the communication with a low priority will temporarily be limited. As a result, the communication may be resumed as soon as the communication state is improved. Hence, it is able to realize the efficient allocation of the communication bands which minimize the delay of the information transmission. According to this configuration, these excellent effects are proven in the aforementioned embodiment.

Moreover, in the aforementioned embodiment, the communication is interrupted as the temporary limit of the communication with a low priority Subsequently, when the situation concerning the communications is improved and the total of the required communication bands is settled within the available communication band, or when the priority of the interrupted communication relatively rises not to be a target of the limit, the communication will be resumed. As a result, it is able to realize the efficient allocation of the communication bands which minimize the delay of the information transmission. These excellent effects are proven in the aforementioned embodiment.

Further, in the aforementioned embodiment, the image quality is reduced by changing a coding format (CODEC), for example, by increasing the compression ratio, as the temporary limit of the communication with a low priority. As a result, necessary communication bands may be reduced. Hence, it is able to maintain the communication while reducing the communication load, and to realize the efficient allocation of the communication bands. These excellent effects are proven in the aforementioned embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A base station apparatus which allocates communication bands for terminal units from an available communication band, and performs wireless communications with the terminal units using the allocated communication bands, comprising:

a priority table storing priority information used for deriving a priority of the communication;

a detecting part detecting a situation change concerning the communications;

a band derivation part deriving communication bands required for the communications with terminal units to communicate, when the detecting part detects the situation change;

a priority derivation part deriving priorities of the communications with the terminal units on the basis of the priority information stored in the priority table;

an allocating part allocating the communication bands derived by the band derivation part for the wireless communications with the terminal units in the order of descending priorities derived by the priority derivation part;

a judging part judging whether or not a total of the communication bands which are required for the communications with the terminal units and are derived by the band derivation part exceeds an available communication band;

a limiting part temporarily limiting at least one of the communications of the terminal units in the order of ascending priorities derived by the priority derivation part, when the total of the required communication bands is judged to exceed the available communication band, wherein the limiting part causes the terminal units to interrupt the communications, the band derivation part derives the communication bands required for the communications with the terminal units including at least one terminal unit in which the communication is interrupted, and the priority derivation part derives the priorities of the terminal units including the at least one terminal unit in which the communication is interrupted, the base station apparatus further comprising:

a resumption part resuming the communication of the at least one terminal unit, when the judging part judges that the total of the required communication bands does not exceed the available communication band, or when the limiting part does not target the at least one terminal unit in which the communication is interrupted, and a part storing communication identification information for identifying the terminal units as a communicative target, when the limiting part causes the terminal units to interrupt the communications, wherein the resumption part resumes the at least one communication on the basis of the communication identification information currently stored.

2. The base station apparatus according to claim 1, wherein the base station apparatus communicates compressed and encoded information with the terminal units, and the limiting part causes the terminal units to change a form of compression and encoding.

3. The base station apparatus according to claim 1, further comprising a part notifying the limiting by the limiting part to the terminal units in which the communications are interrupted.

4. The base station apparatus according to claim 1, wherein the priority table stores two or more items from among types of information to be communicated, attributes of the terminal units to communicate, and importance degrees of the communications as the priority information, and the priority derivation part derives the priorities on the basis of a total of scores previously set to the priority information.

5. A communication system, comprising:
the base station apparatus according to claim 1;
terminal units performing wireless communications with the base station apparatus; and
a communication apparatus communicating with the base station apparatus and communicating with the terminal units via relay of the base station apparatus.

6. A non-transitory computer-readable recording medium which stores a computer-executable program for causing a computer to allocate communication bands for terminal units from an available communication band and to perform wireless communications with the terminal units using the allocated communication bands, the program comprising instructions to execute:

causing the computer, which is connected to a priority table storing priority information used for deriving a priority of communication, to detect a situation change concerning the communications;

causing the computer to derive the communication bands required for the communications with the terminal units to communicate, when the situation change is detected;

causing the computer to derive priorities of the communications with the terminal units, on the basis of the priority information stored in the priority table;

causing the computer to allocate the derived communication bands for the wireless communications with the terminal units in the order of descending derived priorities;

causing the computer to judge whether or not a total of the communication bands which are required for the communications with the terminal units and are derived by the causing the computer to derive the communication band exceeds an available communication band; and causing the computer to temporarily limit at least one of the communications of the terminal units in the order of ascending derived priorities, when the total of the required communication bands is judged to exceed the available communication band, wherein in the temporary limiting, the computer causes the terminal units to interrupt the communications, the computer derives the communication bands required for the communications with the terminal units including at least one terminal unit in which the communication is interrupted, the computer derives the priorities of the terminal units including the at least one terminal unit in which the communication is interrupted, and the computer resumes the communication of the at least one terminal unit, when the computer judges that the total of the required communication bands does not exceed the available communication band, or when the computer does not target the at least one terminal unit in which the communication is interrupted, the program further causing the computer to:
identify the terminal units as a communicative target, when the computer causes the terminal units to interrupt the communications, wherein
the computer resumes the at least one communication on the basis of the communication identification information currently stored.

7. A base station apparatus which allocates communication bands for terminal units from an available communication band, and performs wireless communications with the terminal units using the allocated communication bands, comprising:

a priority table storing priority information used for deriving a priority of the communication;

detecting means for detecting a situation change concerning the communications;

band derivation means for deriving communication bands required for the communications with terminal units to communicate, when the detecting means detects the situation change;

priority derivation means for deriving priorities of the communications with the terminal units on the basis of the priority information stored in the priority table;

allocating means for allocating the communication bands derived by the band derivation means for the wireless communications with the terminal units in the order of descending priorities derived by the priority derivation means;

judging means for judging whether or not a total of the communication bands which are required for the communications with the terminal units and are derived by the band derivation means exceeds an available communication band; and limiting means for temporarily limiting at least one of the communications of the terminal units in the order of ascending priorities derived by the priority derivation means, when the total of the required communication bands is judged to exceed the available communication band, wherein the limiting means causes the terminal units to interrupt the communications, the band derivation means derives the communication bands required for the communications with the terminal units including at least one terminal unit in which the communication is interrupted, the priority derivation means derives the priorities of the terminal units including the at least one terminal unit in which the communication is interrupted, and the base station apparatus further comprises resumption means resuming the communication of the at least one terminal unit, when the judging means judges that the total of the required communication bands does not exceed the available communication band, or when the limiting means does not target the at least one terminal unit in which the communication is interrupted, the base station apparatus further comprising:

a means storing communication identification information for identifying the terminal units as a communicative target, when the limiting means causes the terminal units to interrupt the communications, wherein the resumption means resumes the at least one communication on the basis of the communication identification information currently stored.

* * * * *

UNITED STATES PATENT AND TRADEMARK OFFICE
CERTIFICATE OF CORRECTION

PATENT NO. : 8,140,121 B2
APPLICATION NO. : 12/534689
DATED : March 20, 2012
INVENTOR(S) : Ryuichi Matsukura It is certified that error appears in the above-identified patent and that said Letters Patent is hereby corrected as shown below:

Title page, item "(73) Assignee", delete "Limtied" and insert --Limited--.

Signed and Sealed this
Twenty-eighth Day of August, 2012

David J. Kappos
*Director of the United States Patent and Trademark Office*